(No Model.)  2 Sheets—Sheet 1.

A. G. MATHER.
LOCKING DEVICE FOR SHAFTS.

No. 591,558. Patented Oct. 12, 1897.

Witnesses.
C. W. Keeney
Anita Faust

Inventor.
Allan G. Mather
By Benedict & Morsell
Attorneys.

(No Model.) 2 Sheets—Sheet 2.
A. G. MATHER.
LOCKING DEVICE FOR SHAFTS.
No. 591,558. Patented Oct. 12, 1897.
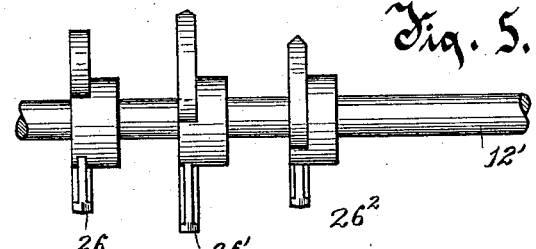
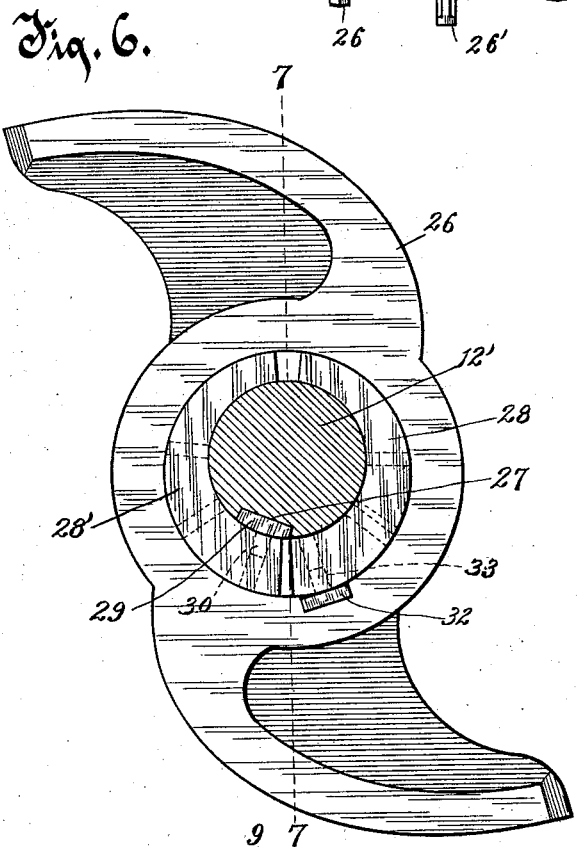
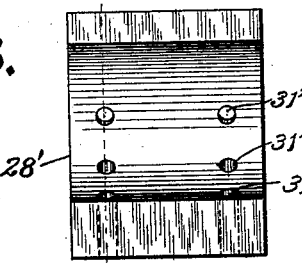
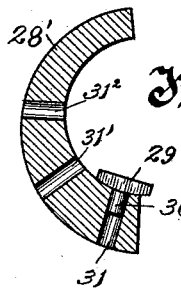
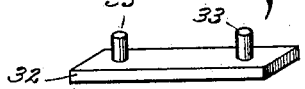
Witnesses:
Inventor.
Allan G. Mather
By Benedict & Morsell
Attorneys.

UNITED STATES PATENT OFFICE.

ALLAN G. MATHER, OF MILWAUKEE, WISCONSIN.

LOCKING DEVICE FOR SHAFTS.

SPECIFICATION forming part of Letters Patent No. 591,558, dated October 12, 1897.

Application filed August 26, 1896. Serial No. 603,986. (No model.)

*To all whom it may concern:*

Be it known that I, ALLAN G. MATHER, of Milwaukee, in the county of Milwaukee and State of Wisconsin, have invented new and useful Improvements in Locking Devices for Shafts, of which the following is a description, reference being had to the accompanying drawings, which are a part of this specification.

In the construction and operation of machinery it is often necessary to securely fasten mechanical devices—such as pulleys, cams, and disks—to shafts or other revolving parts in such a manner that they will hold up to their work under great strain and yet so that they can be readily released and moved on the shaft or removed therefrom.

The object of my invention is to provide an improved device for that purpose and, incidentally thereto, to provide a device all the members of which, by reason of their surfaces being regular curves or flat planes, are readily and inexpensively made, while they are also strong and enduring in character and are readily adjusted, and securely lock the parts in place.

The invention consists of the device and its members and combination of members, as herein described and claimed, or their equivalents.

In Figures 1, 2, 3, and 4 my improved device is illustrated in connection with a shaft and the shell of a roll, with which it is adapted to be used; and in Figs. 5 to 11, inclusive, my improved device, in slightly-modified form, is shown in connection with a shaft and cam.

Figure 1:
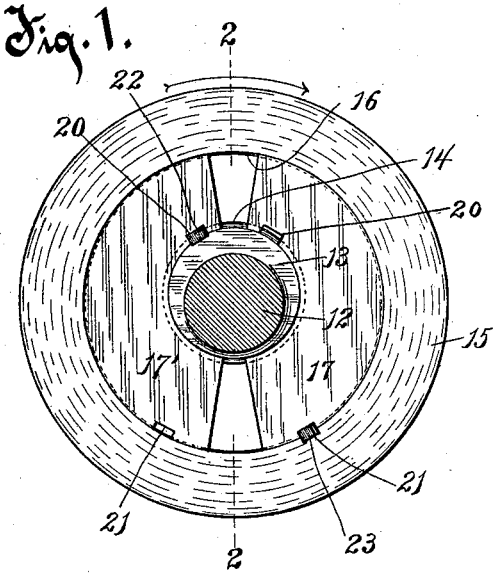
Figure 2:
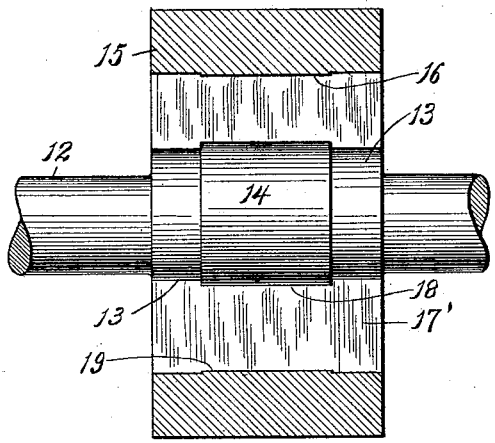
Figure 3:
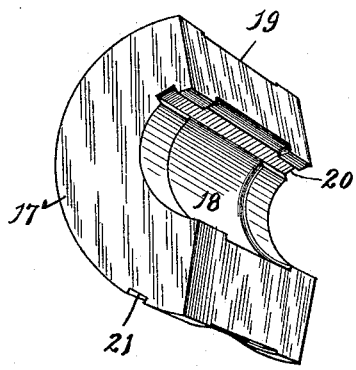
Figure 4:
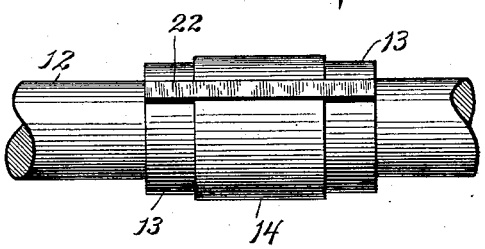

In the drawings, Fig. 1 is an elevation of the shell of a roll and the shaft about and to which the shell is secured by my improved device, shown therewith. Fig. 2 is a central longitudinal section of the shell with a fragment of the shaft and a wedge or member of my locking device. Fig. 3 is a perspective of a wedge or member of my device. Fig. 4 is a fragment of a shaft having annular bosses or enlargements with a key for use with or as part of my improved device. Fig. 5 is a fragment of the shaft, showing thereon a series of cams arranged in different radial positions thereon. Fig. 6 is an elevation of a cam with its shaft in cross-section and my locking device securing the cam adjustable to different radial positions on the shaft. Fig. 7 is a longitudinal section of the cam on line 7 7 of Fig. 6 with a fragment of a shaft and one of the wedges or members of my locking device. Figs. 8 and 9 are respectively a view of the concave surface and a transverse section of a wedge or members of my locking device. Figs. 10 and 11 are perspective views of two keys employed with the wedges in the form of my locking device shown in Figs. 6, 8, and 9.

In Figs. 1, 2, and 4 the shaft 12 is provided with annular eccentric bosses 13 and with a larger and shorter annular boss 14, medially about the eccentric bosses 13. The shell 15 on its interior surface is formed in true circles. The inner surface is provided medially with an inwardly-projecting annular rib or projection 16. The shaft 12 is constructed by turning it off concentric with its own axis, except the annular eccentric bosses 13 and 14, which are turned off about an axis eccentric to the axis of the shaft, the bosses being on their exterior surfaces true circles, though eccentric to the axis of the shaft. Two curves or segmental wedges 17 17' are interposed between the shell 15 and the eccentric boss 13. These wedges are substantially duplicate in form and are conveniently constructed by turning up a block of metal with its periphery substantially of the same circle as the interior surface of the shell 15. This turned block is then bored longitudinally eccentrically thereof, the bore being substantially of the same diameter as the diameter of the eccentric boss 13 and its eccentricity in the turned block being the same as the eccentricity of the boss 13 on the shaft 12. The turned and bored block is then cut longitudinally diametrically into four segments or sections, and the two short segments are removed, leaving long segments or sections in the form shown in Fig. 1. An interior annular channel 18 is formed in the turned block, and an exterior annular channel 19 is turned off the block before it is cut apart, as just described, and these channels are of such length and depth as adapts them, respectively, to receive therein the boss 14 and the rib or projection 16. A longitudinal key-slot 20 is cut in the inner surface of the wedge 17', and a complementary slot is cut in the bosses 13 and 14, and another longitudinal key-slot 21 is cut in the exterior surface of the wedge 17, and the complementary slot is cut in the inner surface of the shell 15. Preferably these slots 20 and 21, cut in the wedges, are duplicated, so that the wedges may be used interchangeably. Keys 22 and 23 are provided, respectively, for the slots 20 and 21. It will be understood that the construction of these parts is such that the shell 15 is readily secured to or released from the shaft by the use of the wedges and keys. The shell being about the shaft the wedges 17 17' can be readily inserted in position in the space between the shell and the bosses 13 and 14 and the keys 22 and 23 inserted, the key 22 locking the wedge 17' to revoluble movement with the shaft 12 and the key 23 locking the wedge 17 revolubly to the shell 15. The necessary play or looseness of parts is secured therefor by bringing the thicker ends of the wedges 17 17' near to each other opposite the thin portion of the bosses 13 and 14. When the parts have thus been placed in position, a slight rotation of the shaft in the direction it is arranged to rotate will carry the wedge 17' with it, thus shifting its position toward and onto the thicker parts of the eccentric bosses 13, wedging it between the shell and the boss, while at the same time the absence of rotary movement in the shell and the other wedge produces a relative movement of said other wedge a like distance in the opposite direction, similarly wedging it between the boss and the shell and locking the shell securely to the shaft. The boss 14, fitting in the channel 18, prevents lateral movement of the wedges on the shaft, and the rib or projection 16, fitting in the channel 19, prevents lateral movement of the shell on the wedges.

A slightly-modified form of my device is adapted for use with adjustable cams, the construction of the wedges being varied to adapt them to permit of adjustment of the cams on their shaft, whereby the cams are arranged in different radial and longitudinal positions on the shaft, as illustrated in Fig. 5. The details of construction and the application of this modified form of my device are illustrated in Figs. 5 to 11, inclusive. The cam 26 is provided with a circular shaft-bore of greater diameter than the diameter of its shaft. The shaft 12' is of the ordinary cylindrical construction and is provided with a longitudinal channel or keyway 27. The curved or segmental wedges 28 28' are constructed substantially in the manner of the construction of the wedges 17 17', having exterior surfaces formed in true circles corresponding with the circle of the bore of the cam 26 and an interior surface corresponding with the curved surface of the shaft 12'. The combined length of the two wedges segmentally is less than the length of the annular space around the shaft between it and the surrounding cam-hub. In this form of the device the annular channels corresponding with the channels 18 and 19 in the form of device shown in Figs. 1, 2, and 3 are omitted. A key 29, fitting in the keyway 27, is provided with pins 30, adapted to enter corresponding holes 31 therefor in the wedge 28, and thereby to hold the wedge to revolution with the shaft. The wedge is provided with other sets 31' and 31² of holes adapted to receive the pins 30, and thereby to permit of adjustment of the wedge revolubly on the shaft. A key 32, fitting in the channel or keyway therefor in the interior surface of the bore of the cam 26, is also provided with pins 33, adapted to enter, from the outside, holes therefor in the wedge 28, corresponding with the sets of holes 31, 31', and 31² in the wedge 28'. By this means the wedge 28 is held to revolution with the cam 26.

It will be understood that by means of the construction described the cam 26 can be locked to the shaft 12' revolubly in substantially the same manner as the shell 15 is locked to its shaft, as hereinbefore described, and that by means of the series of holes 31 31' 32² in the wedges 28 28' the cams 26 can be adjusted in different positions on their shaft, as shown in Fig. 5.

It will also be understood that should one of a series of similar cams on a shaft be broken an adjoining cam can be moved up to the position of the broken and removed cam, and the others (if any) in the set nearer the end of the shaft can be moved up into the places of adjoining cams, and that a new cam can then be put on in the position of the cam nearest the end of the shaft, thus obviating customary necessity of taking off all the cams and putting a new one in the position of the broken one, as in the usual arrangement, in which each cam is fitted and secured to the shaft by means of a specially-prepared key-seat therein.

The pins 30 33 are used, preferably, instead of a mechanically equivalent longitudinal key or portion of a key to obviate cutting away the metal of the wedge to such extent as would be necessary to form the key-channel therefor if the same form of wedge was used as is shown in Figs. 1 and 4, but may be used where desirable.

The bore of the cam, Fig. 6, may be eccentric to its true axis or not, as convenience of construction renders necessary.

What I claim as my invention is—

1. A locking device for shafts comprising a shaft, a mechanism surrounding the said shaft and interposed reversely-disposed curved segmental wedges, one of which is fastened to the shaft and another to the encircling mechanism.

2. A locking device for shafts, comprising a shaft provided with an eccentric annular boss, a mechanism encircling the boss, and interposed reversely-disposed curved segmental wedges, one of which is keyed to the shaft and another to the shell.

3. A locking device for shafts comprising a cylindrical shaft, a mechanism having a bore formed in a true circle, interposed reversely-disposed curved segmental wedges, both the outer and inner surfaces formed on true circles respectively conforming to the surface of the shaft and the bore of the encircling mechanism, and keys holding one wedge to revolution with the shaft and the other to revolution with the encircling mechanism.

4. A locking device for shafts, comprising a shaft provided with an eccentric annular boss formed on a true circle, an annular shell or analogous device having a bore formed in a true circle, interposed reversely-disposed curved segmental wedges both the outer and inner surfaces of which are formed on true circles respectively conforming to the surface of the eccentric boss and to the surface of the bore of the encircling device, and keys holding one wedge to revolution with the shaft and the other to revolution with the encircling device.

5. A locking device for shafts, comprising a shaft provided with an annular eccentric boss and an annular boss medially about the eccentric boss, an annular shell or analogous device provided with an annular interior rib or projection, interposed reversely-disposed curved or segmental wedges provided with interior and exterior channels receiving said annular boss and rib, and keys holding said wedges respectively to revolution with the shaft and with the encircling device.

6. The combination with a shaft and an encircling mechanical device, of interposed curved or segmental wedges reversely disposed and provided with a series of holes or key-seats whereby the wedges are adapted to be secured to an adjacent part adjustable revolubly, and keys adapted to secure the wedges respectively to the shaft and to the encircling device.

In testimony whereof I affix my signature in presence of two witnesses.

ALLAN G. MATHER.

Witnesses:
C. T. BENEDICT,
A. L. MORSELL.